E. E. GOLD.
THERMOSTATIC STEAM TRAP.
APPLICATION FILED AUG. 23, 1912.
1,050,210.
Patented Jan. 14, 1913.
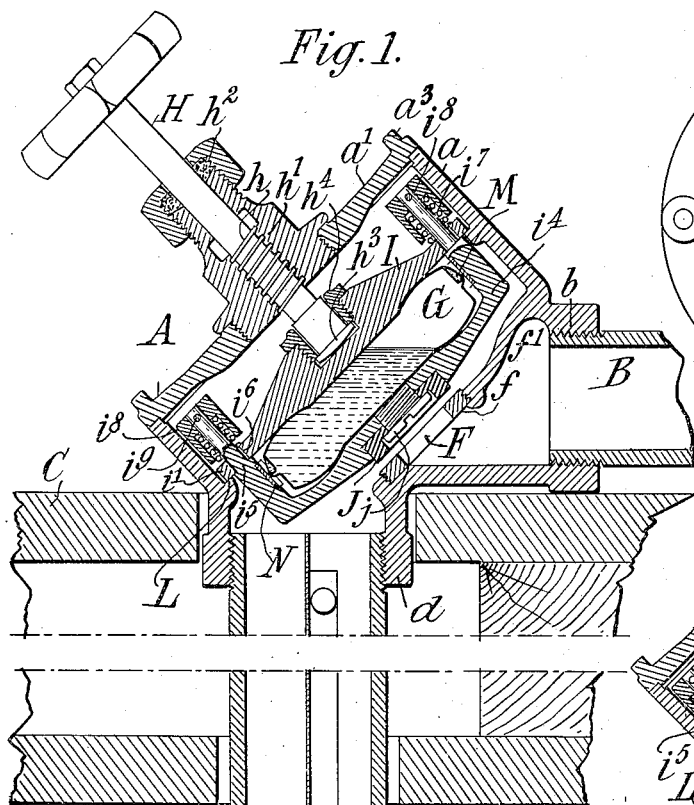
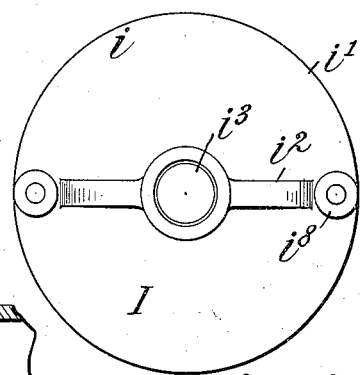
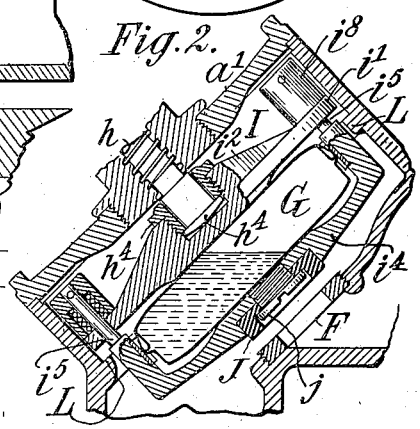
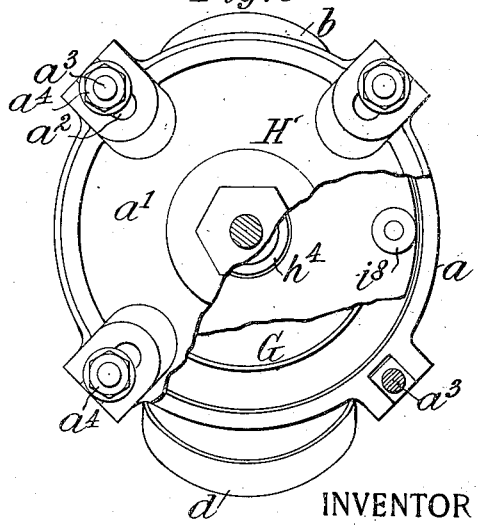
WITNESSES:
René Puine
Fred White
INVENTOR:
Edward E. Gold,
By Attorneys,
Fraser, Turk & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

THERMOSTATIC STEAM-TRAP.

1,050,210.  Specification of Letters Patent.  Patented Jan. 14, 1913.

Application filed August 23, 1912. Serial No. 716,613.

*To all whom it may concern:*

Be it known that I, EDWARD E. GOLD, a citizen of the United States, residing in the borough of Manhattan, city, county, and State of New York, have invented certain new and useful Improvements in Thermostatic Steam-Traps, of which the following is a specification.

My invention relates to thermostatic steam traps adapted more particularly for use upon steam car heating systems.

Hitherto traps adapted to close the outlets of such systems have been situated below the car in the open air. Here the said traps are exposed to the weather, and in the winter great trouble has arisen by reason of the water of condensation freezing upon the traps, and various means have been adopted for overcoming this objection. In such steam heating systems a separate blow-off has usually been provided.

My invention has for its object to provide a trap which may be located inside of the car where it will be protected from the weather; further, to provide a trap which will act both to close the outlet of the steam heating system when desired, and furthermore, which may be adjusted to serve as a blow-off when required.

According to my invention the trap is provided with movable thermostatic means, which means are affected by the temperature of the fluid escaping through the said trap, and which may be adjusted to a position wherein it will when steam is escaping close the outlet of the radiating pipes, and which may be adjusted to a position to hold the said outlet open, whereupon the said trap will act as a blow-off.

A desirable form in which my invention may be embodied is illustrated in the accompanying drawings, where—

Figure 1 illustrates a vertical section of my trap, illustrating likewise a section of the car floor and a portion of the steam heating system to which the same is attached; Fig. 2 is a similar section of the trap illustrating the same in position to act as a blow-off; Fig. 3 is a plan view of the trap; and Fig. 4 is a detail plan view of a portion of the frame for holding the thermostatic vessel.

In the accompanying drawings, the trap, which as a whole is designated A, is attached to the radiating pipe B of a steam heating system above the car floor C. A drip pipe D terminating in the usual horn E is also attached to the trap at a lower part thereof. An inlet passage F in the trap communicates with the radiating pipe B. Within the trap is a thermostatic vessel G, which as illustrated is an expansible diaphragm containing a volatile fluid which is quickly volatilized by the passage of steam through the inlet F and thereupon expands and closes the inlet F. Means are provided to adjust this diaphragm to a position where upon expanding it will close the inlet F, and to another position where it will be ineffective to close the said inlet. In the latter position the inlet F will be open as long as desired, and will enable the passage F to act as a blow-off. The particular means whereby the said diaphragm G is capable of such adjustment as illustrated, comprises a valve stem H which is threaded in part of the casing of the trap A, and has a swivel engagement with a frame I which is movable in the said trap, and whereby the diaphragm is adjusted to and from the casing. Means are provided whereby the diaphragm when in closing position will be maintained out of contact with the inlet F, and such means are yielding means which permit the diaphragm when in closing position upon expansion under the influence of escaping steam, to close the inlet F.

A more detailed description of the precise construction shown is as follows: The casing A comprises a shell or body portion $a$ and a removable cover $a^1$. The cover is provided with slots $a^2$ through which pass swinging body bolts $a^3$ and nuts $a^4$ to secure the cover in position. The valve stem H has a quick thread $h$ engaging a similar thread in a plug $h^1$ threaded into the cover. A stuffing box $h^2$ prevents the escape of steam alongside the valve stem.

The thermostatic vessel G is secured in a frame I which is composed of two members, an upper frame which I call a valve bar $i$, which as illustrated comprises a disk $i^1$ on which is a rib $i^2$ having a socket $i^3$. Within the said socket the enlarged head $h^3$ of the valve stem is secured by a threaded bushing $h^4$, establishing a swivel connection between the valve stem H and the frame I which may be easily disconnected to permit the withdrawal of the valve stem from the frame, and whereby the frame can be moved up and down by the valve stem without turning the frame. The frame I also includes a lower member which I term a valve yoke $i^4$, which preferably carries a valve J adapted to close the inlet F. The valve J is secured to the said frame by a movable screw $j$ to permit the easy removal thereof and replacement by a fresh valve.

Means are provided whereby the expansion of the thermostatic vessel G will expand the frame I by separating the members $i$ $i^4$ thereof. As illustrated, such expansion is accomplished by passing the arms $i^5$ of the yoke $i^4$ through perforations $i^6$ in the valve bar $i$, in which perforations the ends $i^5$ freely slide. Spring means are provided to permit the expansion of the said frame and to contract the same, and as illustrated such spring means are in the form of spiral springs $i^7$ which surround the ends of the said side members $i^5$, and are held in place by keepers $i^8$ which take the form of caps receiving the ends of the said springs and holding the screw in position, and which are pinned to the ends $i^5$ at $i^9$ so as to be removable therefrom if desired. Preferably the inlet F is provided with a valve seat $f$.

I have illustrated my invention in connection with a baffle plate K which is located within the horn E and drip D so as to direct a current of air against the thermostat G and render the same energetic in action. This baffle plate is not claimed herein, but is claimed in my Patent No. 1,007,862 of November 7, 1911.

In order that the frame I may be adjusted to proper position so that the expansion of the thermostatic vessel G will close the inlet F, stops L are provided to limit the inward motion of the said frame, and the said stops take the form of lugs projecting inwardly from the casing against which the ring $i^1$ hits.

In Fig. 1 the valve is illustrated in closing position. It will be perceived here that a slight space exists between the valve J and the valve seat $f$, which opening is sufficient to permit the escape of water of condensation. The valve J is maintained in this position by the spring $i^7$, which it will be observed has lifted the valve yoke $i^5$ until the keepers $i^8$ have been raised a slight distance above the valve bar $i^2$. Immediately upon the escape of steam through the inlet F the thermostatic diaphragm G will be expanded, tending to expand the frame I by separating the members $i$ and $i^4$, and compressing the spring $i^7$. The thermostat will upon such expansion through the valve yoke $i^4$ and the valve J, close the inlet F, and this will remain closed until the cooling of the thermostat, whereupon the spring $i^7$ will as the thermostat contracts gradually raise the valve J from the valve seat $f$, opening the inlet F and permitting the condensed water to escape. When it is desired to blow off the radiator pipes B, the valve stem H is turned through the usual handle provided for that purpose, raising the frame I until the diaphragm is lifted so far from the inlet F that its expansion will no longer cause the valve J to close the said inlet. In this position the steam will escape through the inlet F blowing off through the pipe B as desired. The parts are illustrated in this blow-off position in Fig. 2, where it will be perceived that ample space is permitted for this purpose between the keepers $i^8$ and the cover $a^1$, and between the bushing $h^4$ and the threaded plug $h^1$.

Preferably the valve A is provided with sockets $b$ for attachment to the radiator pipe B, and $d$ for attachment to the drip-pipe D.

The diaphragms G are illustrated as being provided with guiding lugs M which are received between vertical fins N upon the inner faces of the side members $i^5$, and which are arranged in pairs and serve to guide the said diaphragm and to hold the same in place.

It will be seen that my improved thermostatic steam trap is located entirely within the car, whereby the same is protected from the action of the elements, and whereby no ice can form thereon and the said trap is kept freer from dust than if it were situated in the open air below the car. A desirable feature of the construction illustrated is the ease with which the different parts may be removed for the purpose of repair or replacing the same. It will be observed that upon removal of the cover-nuts $a^4$, the cover may be lifted out, carrying with it the frame I and the thermostat G and valve J. If desired a new valve J may easily be inserted by removing screw $j$, or a new valve seat $f$ may be screwed in the bottom wall $f^1$ of the casing. The frame I is removed from the valve stem by unscrewing the bushing $h^4$. Upon removal of the pins $i^9$ the thermostat G may be removed for repair or replacement.

The invention as described is extremely simple in construction. It has few parts to get out of order, and is so simple in operation that no mis-chance can possibly occur even when the same is operated by very unskilled persons. For instance when it is desired to use the trap as a blow-off, the handle may be turned toward open position until the bushing $h^4$ hits against the screw plug $h^1$. When it is desired to have the diaphragm in closing position, the handle will be turned to closing position until the valve bar $i$ hits the stops L.

It will be seen that my invention does not reside necessarily in the particular construction given to the parts. It is not material how the thermostat supporting frame is constructed, nor how the valve stem is connected thereto, nor how the valve is supported. Many modifications may be made from the particular devices indicated, and many equivalent devices may be used within the limits of the appended claims.

I claim as my invention:—

1. A steam trap comprising a casing having an inlet passage, and an outlet, a valve stem threaded in said casing, a movable frame in said casing comprising a valve bar having a swivel connection with said stem, a valve yoke having its ends passed through said valve bar and having spring keepers on such ends and springs between said keepers and said valve bar, an expansible diaphragm between said valve bar and valve yoke having thermostatic liquid therein, adapted to be affected by the temperature of the fluid passing through said inlet passage, and a valve carried by said frame and adapted to close said inlet as the diaphragm expands, and said stem adapted to withdraw said frame to open said inlet passage as a blow-off.

2. In a thermostatic steam trap, a casing having inlet and outlet passages, a removable cover, a removable plug threaded therein, a valve stem threaded in said plug, a thermostat carrier in said casing comprising a valve bar, a removable swivel connection between said bar and said stem, stops for limiting the movement of said valve bar, a valve yoke forming part of said carrier and spring connected to said bar, an expansible diaphragm between said yoke and bar adapted to be affected by the temperature of the fluid passing through said trap and to expand said frame, a valve carried by said yoke and adapted to close said inlet, and to be withdrawn therefrom by said stem, whereupon said inlet is adapted to act as a blow-off.

3. A steam trap comprising a casing having inlet and outlet openings, a valve stem adjustably mounted in said casing, a valve adapted to be moved by said stem and to close one of said openings, an imperforate thermostatic vessel in said casing adjacent said valve but disconnected therefrom adapted to be moved by said stem correspondingly to the movements of said valve, and adapted to move said valve upon expansion, a spring outside of said thermostat adapted to exert pressure upon said valve to withdraw same from said opening.

4. A steam trap comprising a casing having inlet and outlet openings, a screw-threaded valve stem, an expansible frame carried thereby, a valve operated by said frame and adapted to close one of said openings, an expansible thermostatic vessel situated in said frame adapted on expansion to move same apart and move said valve toward its seat, said parts adapted when said frame is withdrawn to permit said opening to act as a blow-off and when the same is advanced to adapt said valve to close said opening when moved by the expansion of the thermostat.

5. A steam trap comprising a casing having inlet and outlet openings, a removable screw-threaded valve stem, an expansible frame carried thereby having a plurality of relatively movable members, a valve carried by said frame and adapted to close one of said openings, an expansible thermostatic vessel located between the members of said frame and adapted on expansion to force the same apart and move said valve toward its seat, said parts adapted when said frame is withdrawn to permit said opening to act as a blow-off and when the same is advanced to adapt said valve to close said opening when moved by the expansion of the thermostat.

6. A steam trap comprising a casing having inlet and outlet openings, a screw-threaded valve stem, an expansible frame carried thereby, a valve operated by said frame and adapted to close one of said openings, an expansible thermostatic vessel situated in said frame adapted on expansion to move same apart and move said valve toward its seat, said parts adapted when said frame is withdrawn to permit said opening to act as a blow-off and when the same is advanced to adapt said valve to close said opening when moved by the expansion of the thermostat, and a spring located in said casing outside said thermostat and exerting its force to contract said frame.

7. A steam trap comprising a casing having inlet and outlet openings, a removable screw-threaded valve stem, an expansible frame carried thereby and removable therefrom, a valve operated by said frame and adapted to close one of said openings, an expansible thermostatic vessel situated in said frame and removable therefrom and adapted on expansion to move same apart and move said valve toward its seat, said parts adapted when said frame is withdrawn to permit said opening to act as a blow-off and when the same is advanced to adapt said valve to close said opening when moved by the expansion of the thermostat.

In witness whereof, I have hereunto signed my name in the presence of two subscribing witnesses.

EDWARD E. GOLD.

Witnesses:
Thomas F. Wallace,
Fred White.